(No Model.) 2 Sheets—Sheet 1.

C. P. STEINMETZ.
SYSTEM OF ELECTRICAL DISTRIBUTION.

No. 563,426. Patented July 7, 1896.

WITNESSES
A. F. Macdonald.
B. B. Hill.

INVENTOR
Charles P. Steinmetz
By his atty
R. Blodgett
atty.

(No Model.) 2 Sheets—Sheet 2.
C. P. STEINMETZ.
SYSTEM OF ELECTRICAL DISTRIBUTION.

No. 563,426. Patented July 7, 1896.

WITNESSES
A. F. Macdonald.
B. B. Hull.

INVENTOR
Charles P. Steinmetz
By Geo. R. Blodgett
Atty.

UNITED STATES PATENT OFFICE.

CHARLES P. STEINMETZ, OF SCHENECTADY, NEW YORK, ASSIGNOR TO THE GENERAL ELECTRIC COMPANY, OF NEW YORK.

SYSTEM OF ELECTRICAL DISTRIBUTION.

SPECIFICATION forming part of Letters Patent No. 563,426, dated July 7, 1896.

Application filed January 30, 1895. Serial No. 536,662. (No model.)

*To all whom it may concern:*

Be it known that I, CHARLES P. STEINMETZ, a subject of the Emperor of Germany, residing at Schenectady, county of Schenectady, State of New York, have invented certain new and useful Improvements in Systems of Electrical Distribution, of which the following is a specification.

The present invention relates to improvements in alternating-current systems of distribution, the principal objects of which are the regulation of alternating-current motors by changing the frequency of the currents supplied thereto, and an arrangement whereby translating devices, or circuits containing such devices, may be transferred from one to another of a number of generators or distributing circuits on which different frequencies are maintained, the transfer to be made in a gradual manner by first changing the frequency in the transferred circuit so as to correspond with that desired after the transfer has been completed.

Figure 1:
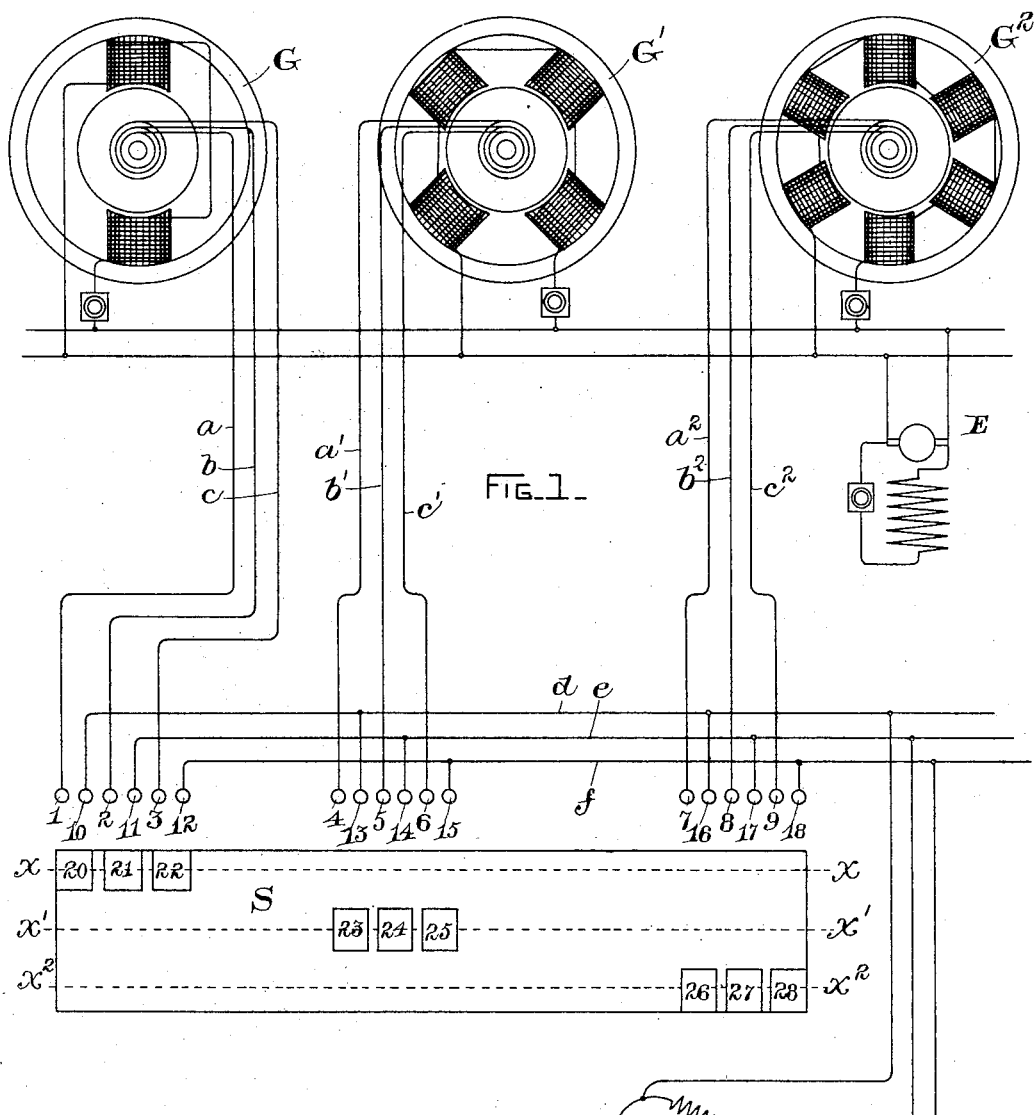
Figure 2:
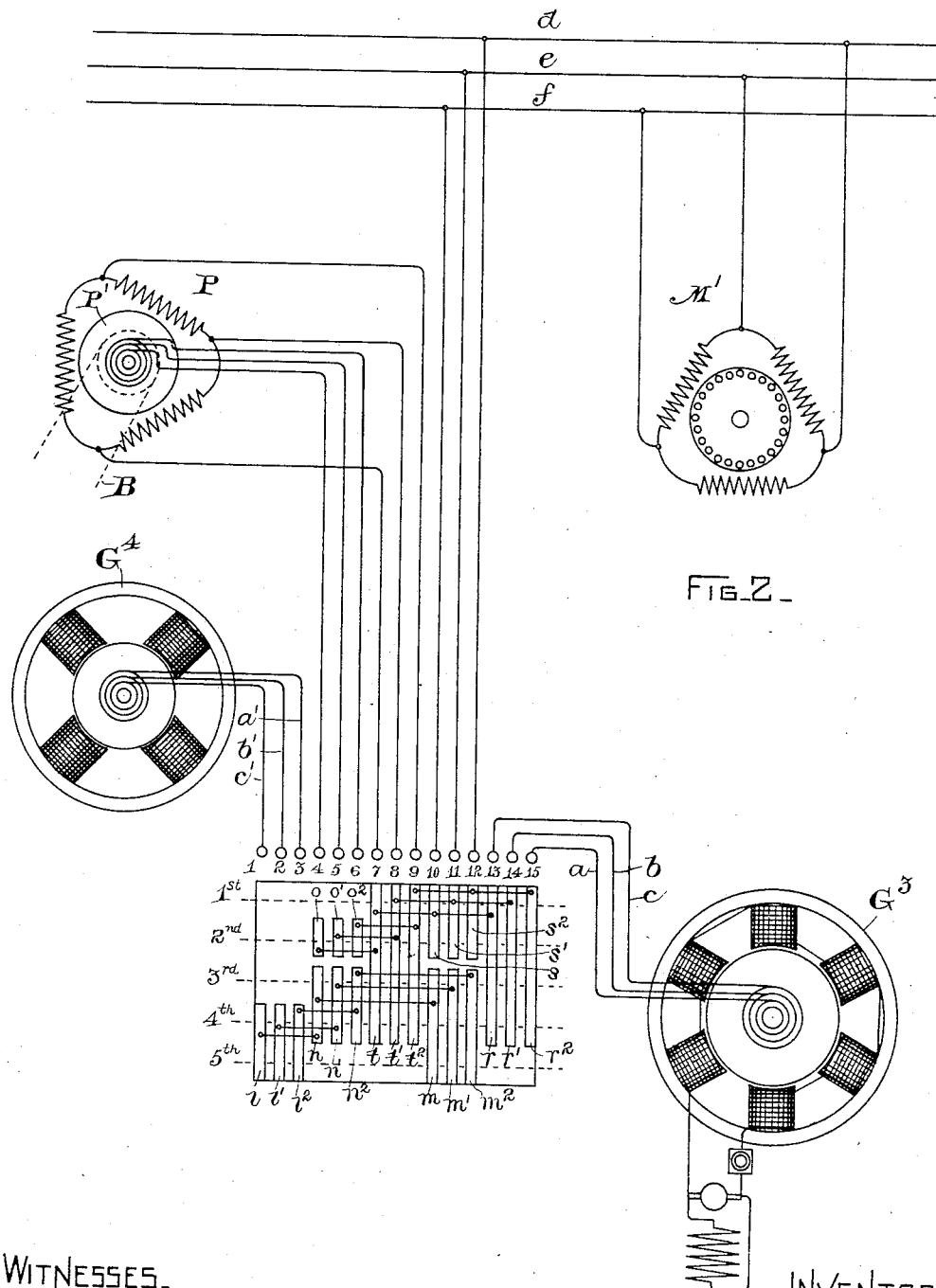

In the accompanying drawings, Figure 1 illustrates a distribution system embodying one feature of the invention in a simple form; and Fig. 2 illustrates in diagram a similar system in which is incorporated the special means for effecting the transfer between circuits of different frequencies, which forms another part of the invention.

In Fig. 1, G G' $G^2$ are alternating three-phase generators of any ordinary construction, though it is to be understood that the invention is equally applicable to other alternating-current systems, either single phase or polyphase in character. The generators have their field-windings supplied with current by a direct-current exciter E in any usual manner, and their armature-terminals are coupled, respectively, to distributing-mains $a\ b\ c$, $a'\ b'\ c'$, $a^2 b^2 c^2$. The construction of the generators is such that the electromotive forces maintained in their respective circuits are of different frequency. To illustrate this, the generator G is shown as a two-pole machine, the generator G' as a four-pole machine, and the generator $G^2$ as a six-pole machine. An alternating-current motor M is shown connected to bus-bars $d\ e\ f$. In a practical installation there may be any number of these motors fed from the bus-bars, both of the synchronous and induction type. The motor illustrated is an induction-motor whose primary coils are connected in delta and coupled to the bus-bars, while the windings of the secondary member are closed through resistances R R' $R^2$, which may be definite in amount or variable, as is now common in the art.

In order to couple the bus-bars, and the motors supplied therefrom, with any desired one of the generators and so change the frequency maintained on the bus-bars, switching mechanism is provided, as shown at S, though of course there is an indefinite number of forms of switches which may be used for this purpose, and hence the invention is not restricted to the form of the switch.

1 2 3 are stationary contacts connected to the low-frequency circuit $a\ b\ c$. 4 5 6 are similar contacts connected to circuit $a'\ b'\ c'$, and 7 8 9 are the third set of contacts coupled to circuit $a^2\ b^2\ c^2$. 10 11 12, 13 14 15, and 16 17 18 are three sets of contacts connected to bus-bars $d\ e\ f$, as illustrated.

The moving member of the switch consists of a drum or slide carrying three sets of contacts 20 21 22, 23 24 25, and 26 27 28. In the first position of the switch, corresponding to line $x\ x$, contacts 20 21 22 bridge the contacts 1 10, 2 11, 3 12, and hence the bus-bars $d\ e f$ and motor M will be coupled to generator G. In the second position of the switch, corresponding to line $x'\ x'$, the contacts 23 24 25 will bridge stationary contacts 4 13, 5 14, 6 15, and the bus-bars will be thrown into circuit with generator G'. In the third position of the switch shown by line $x^2\ x^2$ contacts 26 27 28 will, in a similar manner, put the bus-bars into circuit with the generator $G^2$, assumed to be the one of highest frequency.

In Fig. 2 a high-frequency generator $G^3$ is shown feeding mains $a\ b\ c$, while a generator of lower frequency, $G^4$, supplies the mains $a'\ b'\ c'$. Connected to the bus-bars $d\ e f$ is an induction-motor M', and, of course, it will be understood that other translating devices of any desired character may be operated therefrom. P is the primary member of an induction-motor, designed to serve as a frequency-changer in a manner hereinafter explained. The secondary member of the motor is shown at P'.

Suitable switching mechanism is provided for transferring the bus-bars $d\ e\ f$ from the circuit of one generator to that of another, and is arranged as follows: 1 2 3 are stationary contacts connected, respectively, to the circuit of generator $G^4$. 4 5 6 are similar contacts, connected to the secondary member of the frequency-changer. 7 8 9 are connected to the primary member of the frequency-changer. 10 11 12 are connected to the bus-bars $d\ e\ f$, and 13 14 15 are connected to the circuit of generator $G^3$. The other member of the switch consists of a drum having contacts arranged thereon, which are shown developed on a plane surface in the drawings. In the first position of the switch the metal strips $r\ r'\ r^2$ are connected with contacts 13 14 15, and cross-connected, as indicated, to strips $s\ s'\ s^2$, engaging contacts 10 11 12, and to strips $t\ t'\ t^2$, engaging contacts 7 8 9, so that in this position the bus-bars $d\ e\ f$ are in circuit with the generator $G^3$, the primary member P of the frequency-changer being also in circuit, but the secondary member open-circuited. The frequency on the bus-bars will therefore, of course, correspond with that for which the generator $G^3$ is designed, and the frequency-changer will remain at rest. In the second position of the switch the connections remain as before, except that the secondary circuit P' of the frequency-changer is closed in multiple with the primary by contacts $o\ o'\ o^2$, which are cross-connected to the other sets of contacts, as shown. The frequency-changer still remains at rest, since the magnetism in both members travels in the same direction and at the same speed. In the third position the primary of the frequency-changer is maintained in circuit with the generator $G^3$, as before, by the contacts $r\ r'\ r^2$ and $t\ t'\ t^2$, but the circuit direct is broken between the bus-bars and the generator $G^3$, the bus-bars being put into circuit with the secondary member of the frequency-changer by the contacts $n\ n'\ n^2$, on which 4, 5, and 6 rest, and cross-connected to contacts $m\ m'\ m^2$, with which 10 11 12 are now in engagement. The bus-bars are now connected indirectly to the high-frequency source through the frequency-changer. The secondary member P' of the frequency-changer will start into rotation, and consequently the frequency in the bus-bar circuit will decrease. When the frequency has fallen to a value corresponding to that of the low-frequency generator $G^4$, the switch is thrown to the fourth position, and the generator $G^4$ is brought into circuit by contacts $l\ l'\ l^2$, which are cross-connected to contacts $n\ n'\ n^2$ and $m\ m'\ m^2$. In the fifth position the transfer is completed, cutting out the frequency-changer and disconnecting the bus-bars entirely from the high-frequency circuit. The bus-bars are then directly in circuit with the low-frequency generator through contacts $l\ l'\ l^2$ and $m\ m'\ m^2$. The change in frequency effected by the frequency-changer will, of course, be determined by its speed of rotation relatively to the frequency of the currents supplied to its primary member. In many cases it will be desirable to regulate the speed of rotation by a brake or other load-consuming mechanical power, or by some motor mechanism supplying mechanical power when the frequency is to be raised rather than lowered. For this purpose I have shown a belt B, passing around a pulley on the motor-shaft, which may be connected to a braking mechanism or to a motor mechanism supplying power as required in any particular case. The transfer from one circuit to another can be made in the manner described without stopping the motor operated from the bus-bars $d\ e\ f$, and the speed of the motors can be changed gradually, so as to correspond with the new frequencies supplied to them.

What I claim as new, and desire to secure by Letters Patent of the United States, is—

1. The method of transferring an electric translating device or circuit containing such devices, from a source of alternating currents of given frequency to a source of different frequency, which consists in coupling the circuit to the first source through an intermediate frequency-changer, changing the frequency so as to correspond with that of the second source, and then completing the transfer.

2. The method of transferring an electric translating device, or circuit containing such devices, from a circuit of given frequency to a second circuit of different frequency, which consists in first changing the frequency in the device or circuit to be transferred so as to correspond with the desired frequency after the transfer is made, and then making such transfer, as set forth.

3. The combination of sources of alternating currents of different frequencies with a circuit, a switch or switches for transferring said circuit from one to another of the supply sources, and a frequency-changer for changing the frequency in the circuit to be transferred to a value corresponding to that of the source to which the transfer is to be made.

4. The combination of a translating device, or circuit containing such devices, and alternating supply-circuits of different frequency, with a transfer switch or switches, and an induction-motor brought into circuit to alter the frequency of the circuit to be transferred so as to correspond with the frequency in the circuit to which the transfer is to be made.

5. The combination of alternating supply-circuits of different frequencies, with a translating device or circuit, and an induction-motor whose primary is connected to one such supply-circuit, and whose secondary is in circuit with the translating device, and means for so controlling the speed of the induction-motor that the frequency in the circuit of the translating device may be made to correspond with that of either of the supply-circuits.

In witness whereof I have hereunto set my hand this 28th day of January, 1895.

CHARLES P. STEINMETZ.

Witnesses:
B. B. HULL,
A. F. MACDONALD.